US011345264B2

(12) United States Patent
Lozano Omaña et al.

(10) Patent No.: US 11,345,264 B2
(45) Date of Patent: May 31, 2022

(54) VEHICLE SEAT ASSEMBLY (71) Applicant: Ford Global Technologies, LLC, Dearborn, MI (US)

(72) Inventors: Fernando Lozano Omaña, Cuauhtemoc (MX); Dante Arturo Rodriguez Camacho, Texcoco (MX); Luis Enrique Castillo Jaime, Distrito Federal (MX); Michelle Carolina Herrera Gutienez, Cuiajimalpa de Morelos (MX); Zhibing Deng, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/064,694

(22) Filed: Oct. 7, 2020

(65) Prior Publication Data
US 2022/0105840 A1 Apr. 7, 2022

(51) Int. Cl.
*B60N 2/427* (2006.01)
*B60N 2/42* (2006.01)
*B60N 2/02* (2006.01)
*B60N 2/22* (2006.01)

(52) U.S. Cl.
CPC ....... *B60N 2/42709* (2013.01); *B60N 2/0276* (2013.01); *B60N 2/224* (2013.01); *B60N 2/4235* (2013.01); *B60N 2/4279* (2013.01)

(58) Field of Classification Search
CPC .. B60N 2/42709; B60N 2/0276; B60N 2/224; B60N 2/4235; B60N 2/42745; B60N 2/4279
See application file for complete search history.

(56) References Cited

U.S. PATENT DOCUMENTS

| 3,342,528 | A | * | 9/1967 | Radke | A47C 7/48 297/383 |
| 5,328,234 | A | * | 7/1994 | Daniel | B60N 2/4235 296/68.1 |
| 7,640,090 | B2 | * | 12/2009 | Uchida | B60N 2/002 701/49 |
| 8,998,335 | B2 | * | 4/2015 | Buehlmeyer | B60N 2/809 297/409 |
| 2002/0147535 | A1 | * | 10/2002 | Nikolov | B60N 2/4214 701/45 |

(Continued)

FOREIGN PATENT DOCUMENTS

| DE | 4209605 A1 | 10/1992 |
| DE | 102004002809 A1 | 8/2005 |
| DE | 102018204486 A1 | 10/2019 |

OTHER PUBLICATIONS

Jakobsson, L., et al., "WHIPS—Volvo's whiplash protection study," Accident Analysis and Prevention 32, (2000), pp. 307-319.

*Primary Examiner* — Philip F Gabler
(74) *Attorney, Agent, or Firm* — Frank A. MacKenzie; Bejin Bieneman PLC (57) ABSTRACT

An assembly includes a seat bottom having a rear and a pair of sides extending in a seat-forward direction from the rear. The assembly includes a seatback rotatably supported by the seat bottom. The assembly includes an active actuator operatively connected to the seatback to rotate the seatback about a vertical axis toward one of the sides of the seat bottom.

16 Claims, 6 Drawing Sheets

(56) References Cited

U.S. PATENT DOCUMENTS

2003/0136598 A1* 7/2003 Korechika ........... B60N 2/4221
 180/268
2018/0022244 A1* 1/2018 Duncan ............. B60N 2/42736
 297/216.17

* cited by examiner

VEHICLE SEAT ASSEMBLY

BACKGROUND

Vehicles may be subject to impact tests to test the movement of vehicle occupants. Such tests may be standardized by various governmental or industry organizations. Some test, for example, measure the movement of vehicle occupants during vehicle impacts that move the vehicle occupants in cross-vehicle directions. These tests include side impact tests and oblique impact tests.

DETAILED DESCRIPTION

An assembly includes a seat bottom having a rear and a pair of sides extending in a seat-forward direction from the rear. The assembly includes a seatback rotatably supported by the seat bottom. The assembly includes an active actuator operatively connected to the seatback to rotate the seatback about a vertical axis toward one of the sides of the seat bottom.

The active actuator may include pyrotechnic material.

The assembly may include a bracket rotatably supported by the seat bottom, the seatback rotatably supported by the bracket.

The seat bottom may include a pair of longitudinal frame members, the bracket rotatably supported by the longitudinal frame members.

The seat bottom may include a base plate fixed to the longitudinal frame members, the bracket rotatably supported by the base plate.

The bracket may be between the pair of longitudinal frame members.

The bracket may include legs extending away from the seat bottom, and the seatback may include a pair of upright frame members connected to the legs of the bracket.

The upright frame members of the seatback may be between the legs of the bracket.

The assembly may include a swivel connected between the seat bottom and the seatback.

The swivel may permit rotation of the seatback toward one of the sides of the seat bottom and inhibit rotation of the seatback toward the other of the sides of the seat bottom.

The swivel may include a ratchet gear and a pawl.

The active actuator may be operatively connected to the swivel.

The assembly may include a cable connecting the active actuator to the swivel.

The swivel may include a hub, and the cable may be wound around the hub.

The assembly may include a frangible pin inhibiting rotation of the swivel in an unfractured state and permitting rotation in a fractured state, and actuation of the active actuator may change the frangible pin from the unfractured state to the fractured state.

The assembly may include a computer in communication with the active actuator, the computer having a processor and a memory storing instructions executable by the processor to command the active actuator to rotate the seatback.

The instructions may include instructions to command the active actuator to rotate the seatback in response to detecting an impact to a vehicle.

The instructions may include instructions to identify a side of the vehicle receiving the impact, and to actuate the active actuator to rotate the seatback away from the side of the vehicle receiving the impact.

With reference to FIGS. 1-6, wherein like numerals indicate like parts throughout the several view, an assembly 20 for a vehicle 22 includes a seat bottom 24 having a rear 26 and a pair of sides 28 extending in a seat-forward direction D1 from the rear 26. The assembly 20 includes a seatback 30 rotatably supported by the seat bottom 24. The assembly 20 includes an actuator 32 (shown FIG. 5) operatively connected to the seatback 30 to rotate the seatback 30 about a vertical axis A1 toward one of the sides 28 of the seat bottom 24.

Rotation of the seatback 30 about the vertical axis A1 toward one of the sides 28 of the seat bottom 24 may control kinematics of an occupant seated on the seat bottom 24, e.g., during a side impact to the vehicle 22 and by limiting cross-vehicle movement of the occupant. In other words, rotation of the seatback 30 may change a direction of normal forces applied to the occupant, e.g., by a front surface and side bolsters of the seatback 30 and relative to a remainder of the vehicle 22. The redirected normal forces may provide increased force along a cross-vehicle axis A3, e.g., compared to normal forces provided by a seatback that is not rotated towards one of the sides 28 of the seat bottom 24 and instead faces a front 34 or a rear 36 of the vehicle 22. The redirected normal forces may provide aid in achieving favorable results for the vehicle 22 when subject to a crash test that tests cross-vehicle movement of the occupant.

The vehicle 22 may be any suitable type of automobile, e.g., a passenger or commercial automobile such as a sedan, a coupe, a truck, a sport utility vehicle, a crossover vehicle, a van, a minivan, a taxi, a bus, etc. The vehicle 22, for example, may be an autonomous vehicle. In other words, the vehicle 22 may be autonomously operated such that the vehicle 22 may be driven without constant attention from a driver, i.e., the vehicle 22 may be self-driving without human input.

Figure 1:
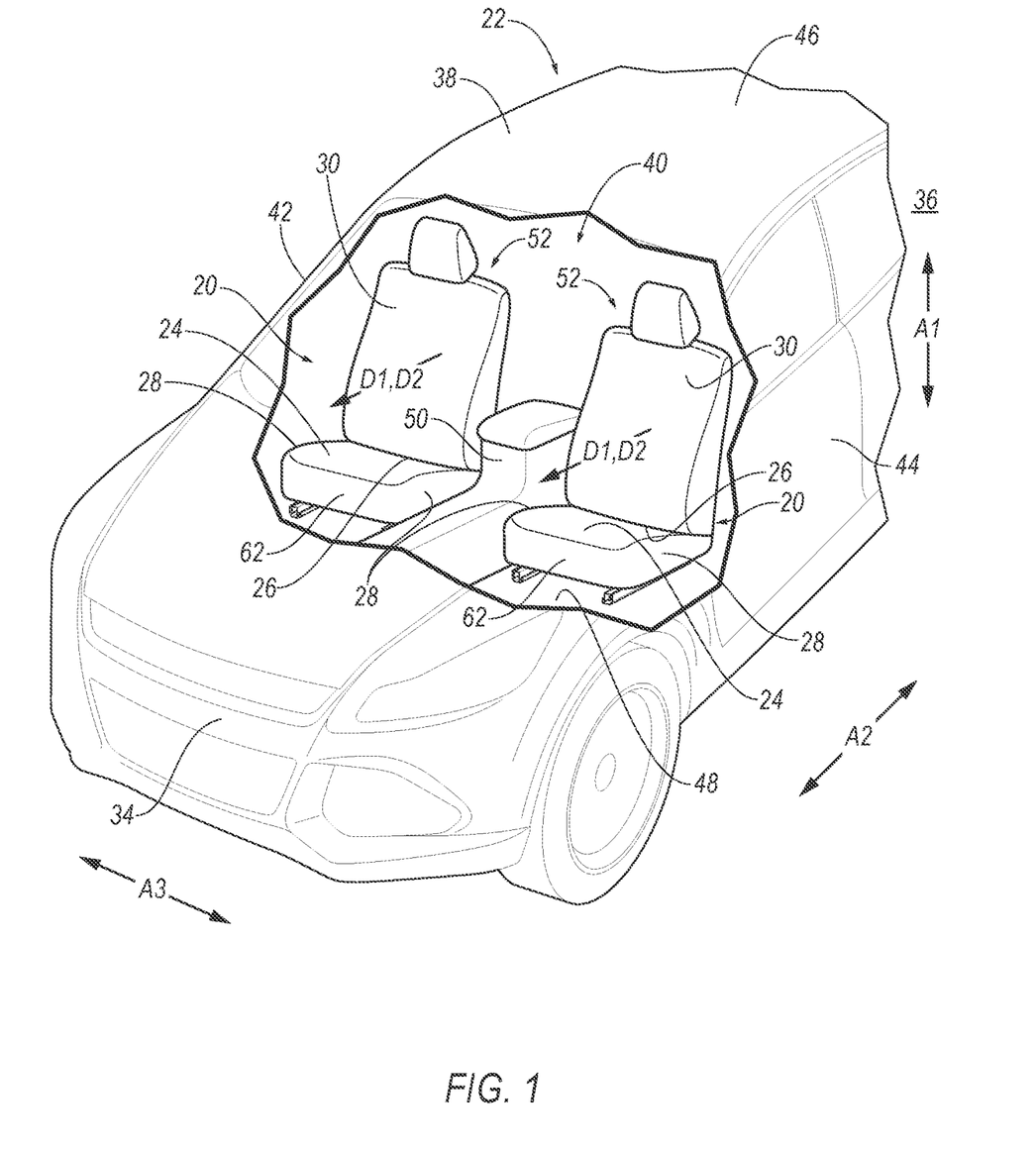
FIG. 1 is a perspective view of a vehicle and showing a passenger cabin.

The vehicle 22 may include a body 38. The vehicle 22 body 38 includes body panels partially defining an exterior of the vehicle 22. The body 38 panels may present a class-A surface, e.g., a finished surface exposed to view by a customer and free of unaesthetic blemishes and defects.

The body 38 may define a passenger cabin 40 to house occupants, if any, of the vehicle 22. The passenger cabin 40 may extend across the vehicle 22, i.e., from a right side 42 to a left side 44 of the vehicle 22. A roof 46 and a floor 48 of the vehicle 22 may further define the passenger cabin 40.

The vehicle 22 defines a longitudinal axis A2 extending between the front 34 and the rear 36 of the vehicle 22. The vehicle 22 defines a cross-vehicle axis A3 extending between the right side 42 and the left side 44 of the vehicle 22. The vehicle 22 defines the vertical axis A1 extending through the roof 46 and the floor 48 of the vehicle 22. The longitudinal axis A2 and the cross-vehicle axis A3 are perpendicular to each other. The vertical axis A1 is transverse to the longitudinal axis A2 and the cross-vehicle axis A3. For example, the vertical axis A1 may be perpendicular to both the longitudinal axis A2 and the cross-vehicle axis A3.

The vehicle 22 may include a center console 50 in the passenger cabin 40. The center console 50 may be centered between the right side 42 and the left side 44 of the vehicle 22. The center console 50 may be elongated along the longitudinal axis A2. The center console 50 may include an armrest, cupholders, etc. The center console 50 may be between seats 52 of the vehicle 22.

One or more seats 52 may by supported in the passenger cabin 40, e.g., by the floor 48. One seat 52 may be at the right side 42 of the vehicle 22 and another seat 52 may be at the left side 44 of the vehicle 22. The seats 52 may be on opposite sides of the center console 50, e.g., with the center console 50 between the seat 52 at the right side 42 and the seat 52 at the left side 44 along the cross-vehicle axis A3.

Each seat 52 defines an occupant seating area. The occupant may be disposed in the occupant seating area. The occupant seating area may be on a front side of the seatback 30 and a top side of the seat bottom 24. Each seat 52 defines the respective seat-forward direction D1. The seat-forward is a facing direction of an occupant of such seat 52 under normal operating conditions, e.g. extending from the rear 26 of the seat bottom 24 toward a front 62 of the seat bottom 24 along the longitudinal axis A2. The front 62 and the rear 26 of each seat 52 are relative to an orientation of the seat 52, with the seatback 30 at the rear 26 of the seat 52. The sides 28 extending in the seat-forward direction D1 from the rear 26, e.g., along the longitudinal axis A2. The sides 28 may be spaced from each other along the cross-vehicle axis A3.

Each seat 52 includes the seatback 30 and the seat bottom 24. The seatback 30 may be supported by the seat bottom 24, e.g., at the rear 26 of the seat bottom 24, and may be stationary or movable relative to the seat bottom 24. The seatback 30 and the seat bottom 24 may be adjustable in multiple degrees of freedom. Specifically, the seatback 30 and the seat bottom 24 may themselves be adjustable, in other words, adjustable components within the seatback 30 and/or the seat bottom 24, and/or may be adjustable relative to each other.

Figure 3:
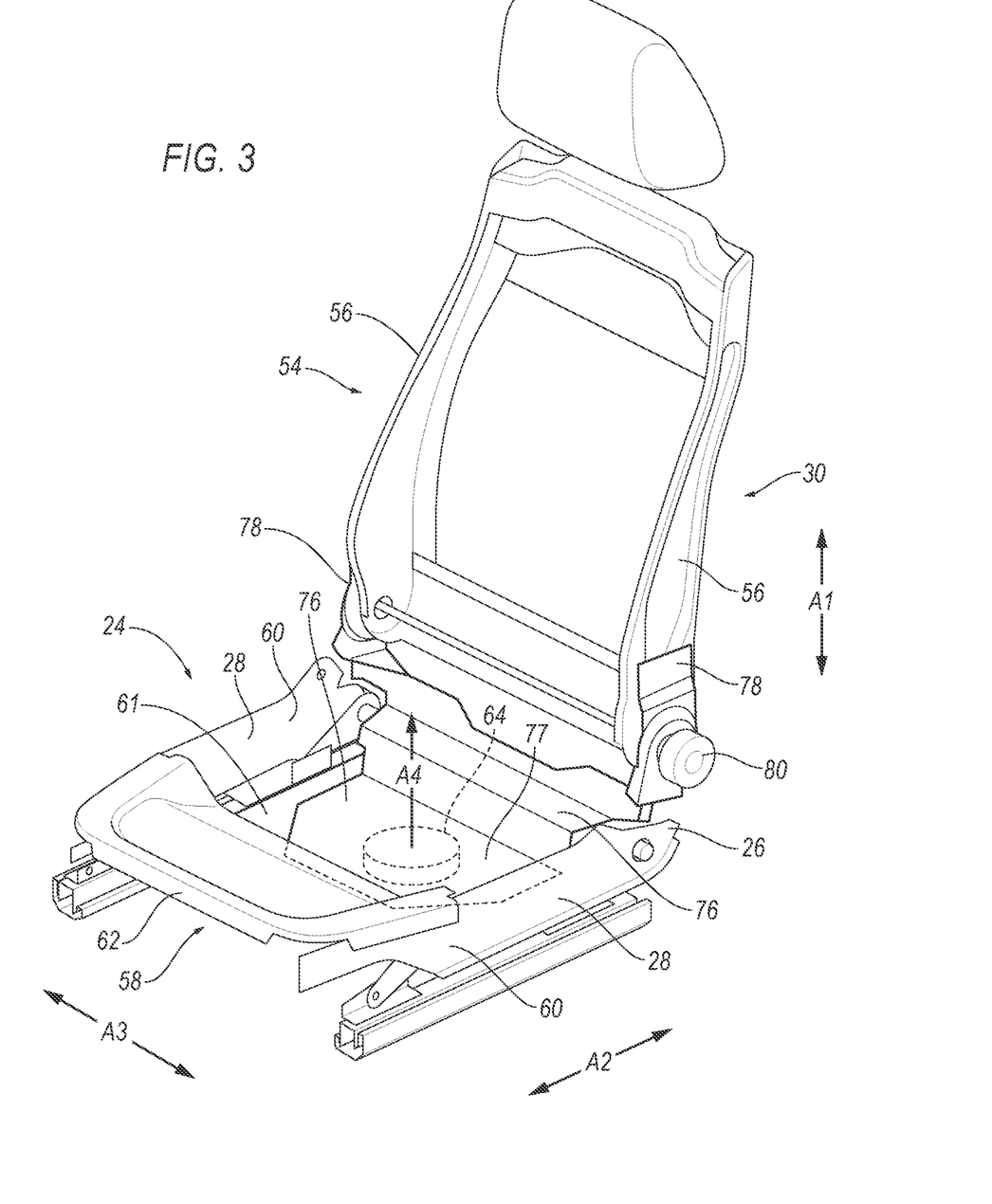
FIG. 3 is a perspective view of components of the seat.
Figure 4:
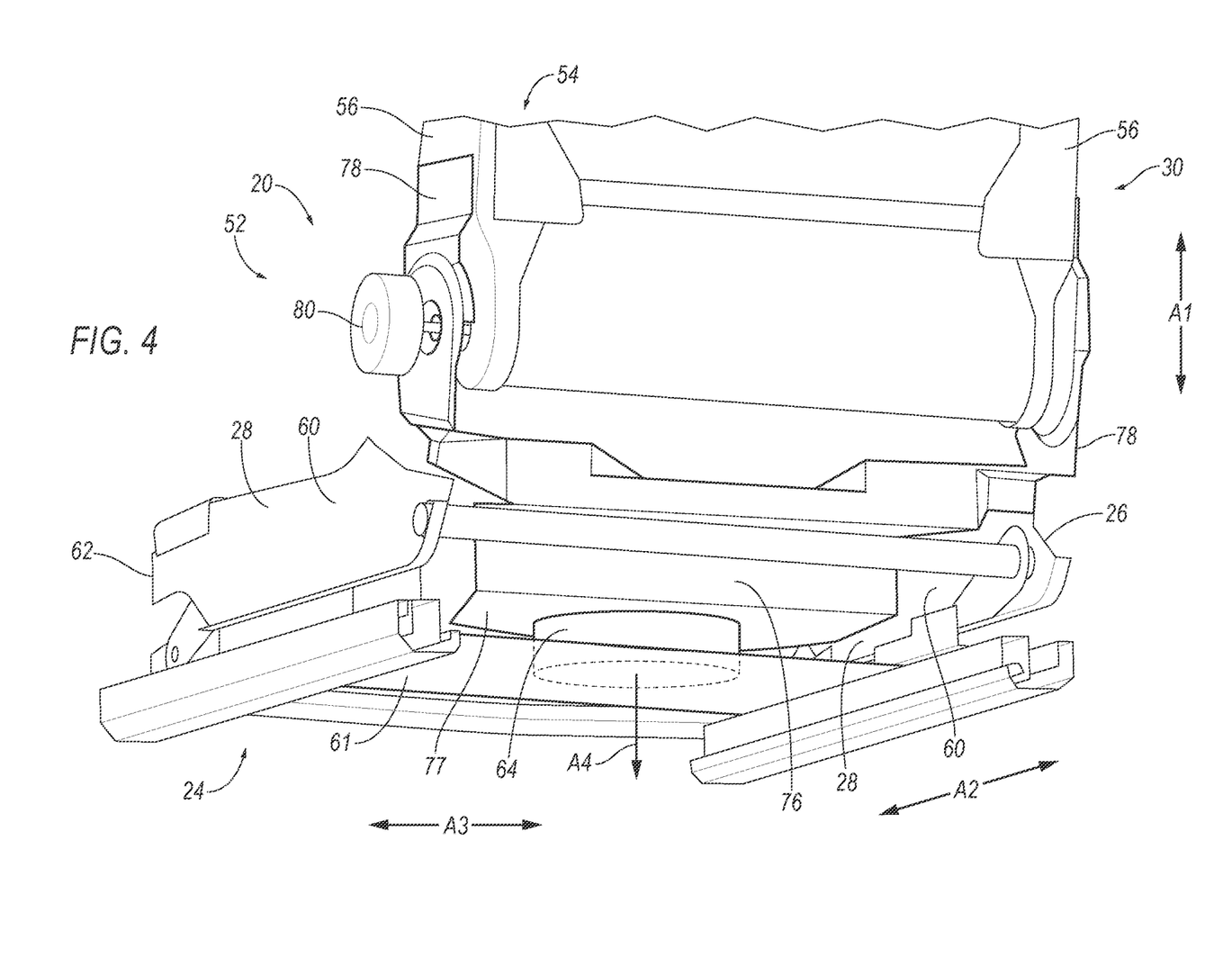
FIG. 4 is a perspective view of components of the seat.

The seatback 30 may include a seatback frame 54 and a covering supported on the seatback frame 54. The seatback frame 54 may include tubes, beams, etc. Specifically, the seatback frame 54 may include a pair of upright frame members 56. The upright frame members 56 are elongated in a generally upright direction when the seatback 30 is in a generally upright position. For example, the upright frame members 56 may by elongated and extend from a bottom to a top of the seatback 30. The bottom of the seatback 30 may be at the seat bottom 24 and the top of the seatback 30 may be spaced from and above the seat bottom 24 along the vertical axis A1. The upright frame members 56 are spaced from each other, e.g., along the cross-vehicle axis A3. The seatback frame 54 may include cross-members extending between the upright frame members 56 e.g., along the cross-vehicle axis A3. The seatback frame 54, including the upright frame members 56, may be of any suitable plastic material, e.g., carbon fiber reinforced plastic (CFRP), glass fiber-reinforced semi-finished thermoplastic composite (organosheet), etc. As another example, some or all components of the seatback frame 54 may be formed of a suitable metal, e.g., steel, aluminum, etc.

The seat bottom 24 may include a seat bottom frame 58 and a covering supported on the seat bottom frame 58. The seat bottom frame 58 may include tubes, beams, etc. Specifically, the seat bottom frame 58 includes a pair of longitudinal frame members 60. The longitudinal frame members 60 are elongated in a generally longitudinal direction, e.g., away from the rear 26 of the seat in the seat-forward direction D1. As another example, the longitudinal frame members 60 may be elongated along the longitudinal axis A2 of the vehicle 22. The longitudinal frame members 60 are spaced from each other e.g., along the cross-vehicle axis A3. The seat bottom frame 58 may include cross-members extending between the longitudinal frame members 60, e.g., along the cross-vehicle axis A3. For example, the longitudinal frame members 60 may be at the sides 28 of the seat bottom 24. The seat bottom frame 58 may include a base plate 61. The base plate 61 may extend between the sides 28 of the seat bottom 24 and between the front 62 and the rear 26 of the seat bottom 24. The base plate 61 may extend from one of the longitudinal frame members 60 to the other of the longitudinal frame members 60. The base plate 61 may be fixed to the longitudinal frame members 60, e.g., via fastener, weld, etc. The seat bottom frame 58, including the longitudinal frame members 60, may be of any suitable plastic material, e.g., carbon fiber reinforced plastic (CFRP), glass fiber-reinforced semi-finished thermoplastic composite (organosheet), etc. As another example, some or all components of the seat bottom frame 58 may be formed of a suitable metal, e.g., steel, aluminum, etc.

Figure 2:
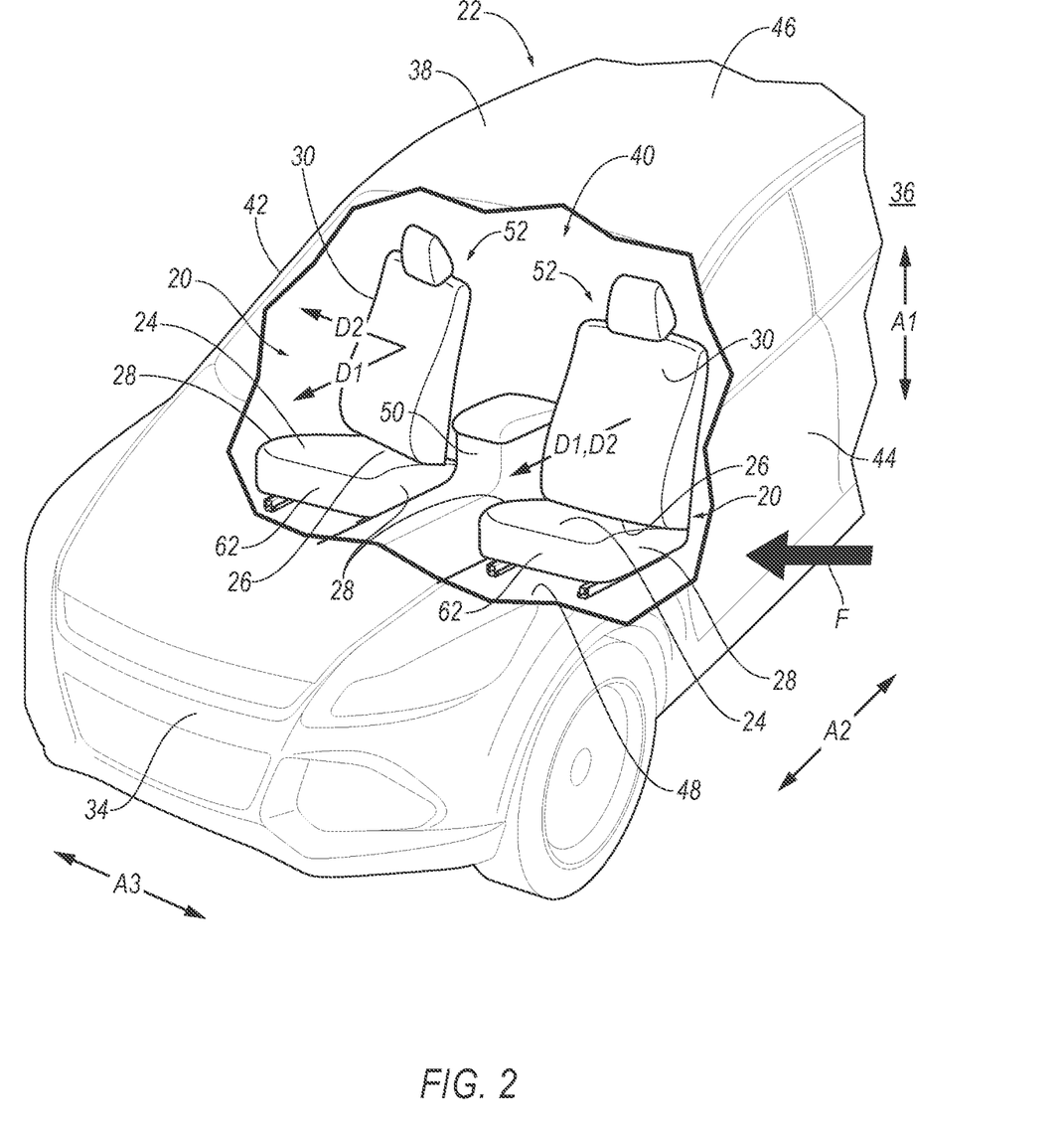
FIG. 2 is a perspective view of the vehicle having a seat with a seatback in a rotated position.

The seatback 30 is rotatably supported by the seat bottom 24. The seatback 30 may rotate about the vertical axis A1 relative to the seat bottom 24 and move a facing direction D2 of the seatback 30 from the seat-forward direction D1 toward one of the sides 28 of the seat bottom 24, e.g., as shown in FIG. 2. The facing direction D2 of the seatback 30 is generally normal to the front surface of the seatback 30.

The seatback 30 may be supported by a swivel 64 connected between the seat bottom 24 and the seatback 30. The swivel 64 permits rotation of the seatback 30 toward the sides 28 of the seat bottom 24. The swivel 64 may include a bushing, a thrust bearing and/or any other suitable structure for providing relative rotation between two components. The swivel 64 may be supported by base plate 61. The swivel 64 may be fixed to the base plate 61. The swivel 64 defines and provides rotation about a rotational axis A4. The rotational axis A4 may be parallel to the vertical axis A1.

Figure 5:
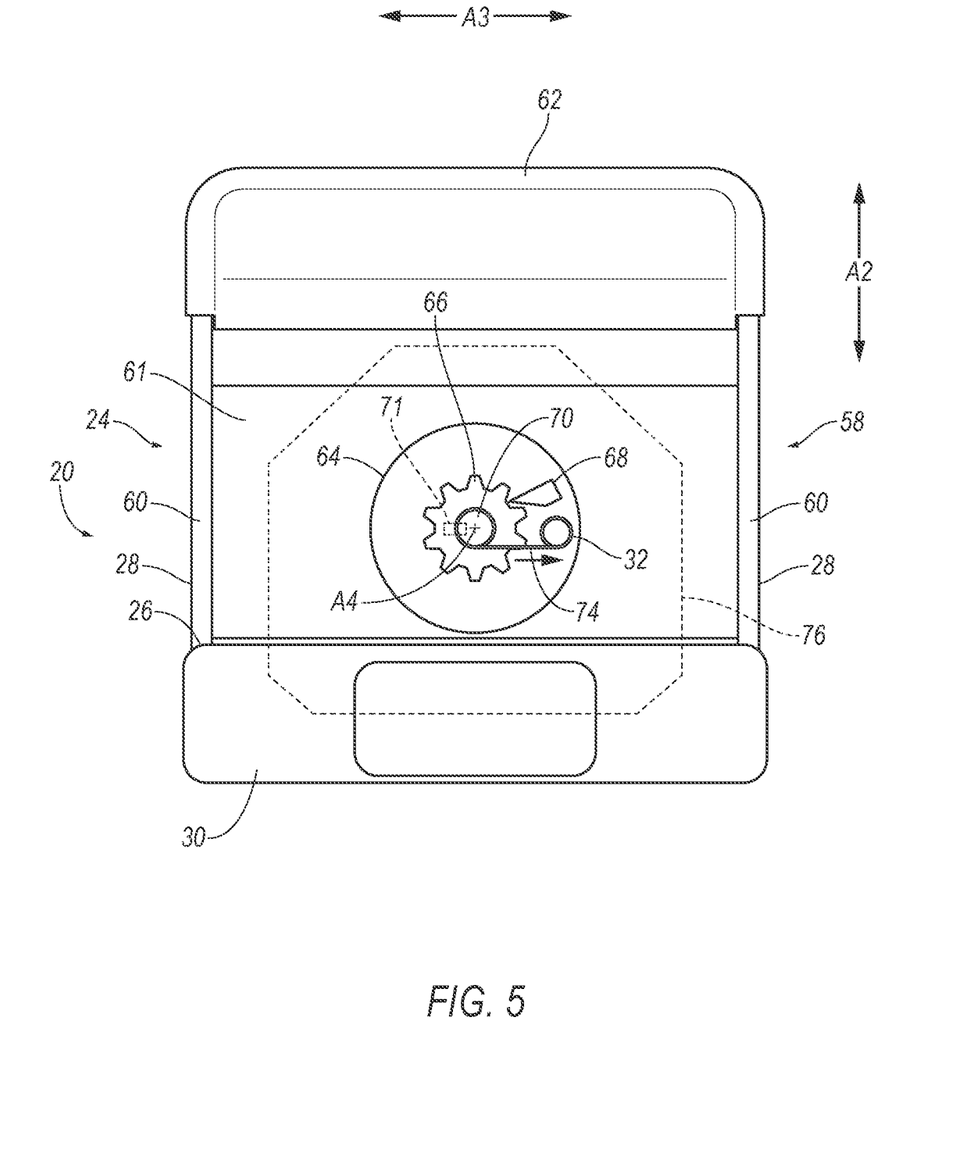
FIG. 5 is a top view of components of the seat.

The swivel 64 may permit rotation towards only one of sides 28 of the seat bottom 24 and inhibit rotation of the seatback 30 toward the other of the sides 28 of the seat bottom 24. Permitting rotation of the seatback 30 in one direction and inhibiting rotation of the seatback 30 in the other direction enables rotating the seatback 30 in the permitted direction to a rotated position (e.g., moving the facing direction D2 of the seatback 30 from the seat-forward direction D1 toward one of the sides 28), and then, maintaining the seatback 30 in the rotated position by the inhibition of rotation in the opposite direction. For example, the swivel 64 may include a ratchet gear 66 and a pawl 68, as shown in FIG. 5. The ratchet gear 66 may be fixed relative to one the seat bottom 24 or the seatback 30 and may rotate about the rotational axis A4 of the swivel 64 relative to the other of the seat bottom 24 or the seatback 30. The pawl 68 may be supported opposite of the ratchet gear 66, i.e., the pawl 68 may be supported by the seatback 30 when the ratchet gear 66 is fixed relative the seat bottom 24, and the pawl 68 may be supported by the seat bottom 24 when the ratchet gear 66 is fixed relative the seatback 30. The pawl 68 may engage teeth of the ratchet gear 66. Normal force from a first surface of the pawl 68 may urge the pawl 68 up and over the teeth, e.g., permitting rotation in one direction. Normal force from a second surface of the pawl 68 may apply torque to teeth of the ratchet gear 66, e.g., inhibiting rotation in an opposite direction.

With reference to FIG. 5, the swivel 64 may include a hub 70. The hub 70 may be fixed relative to one of the seat bottom 24 or the seatback 30. The hub 70 may rotate about the rotational axis A4 of the swivel 64 relative to the other of the seat bottom 24 or the seatback 30. The hub 70 may be centered on the rotational axis A4 of the swivel 64. The hub 70 and the ratchet gear 66 may be co-axial, e.g., both centered and rotatable about the rotational axis A4. The hub 70 may be fixed to the ratchet gear 66, i.e., such the hub 70 and the ratchet gear 66 rotate about the rotational axis A4 in unison. Alternately, the pawl 68 may be fixed to the ratchet gear 66. The hub 70 is shown as circular but may be any suitable shape for generating torque about the rotational axis A4, e.g., the hub 70 may include a level arm, an oblong shape, etc.

The swivel 64 may include a frangible pin 71 that controls rotation of the swivel 64. The frangible pin 71 is moveable from an unfractured state to a fractured stated. The frangible pin 71 in the unfractured state inhibits rotation of the swivel 64, i.e., fixes the seat bottom 24 and the seatback 30 relative to each other about the rotational axis A4. The frangible pin 71 in the fractured state permits rotation of the swivel 64. The frangible pin 71 engages the hub 70 and one of the seat bottom 24 or the seatback 30. Specifically, the frangible pin 71 inhibits movement of the hub 70 relative to the one of the seat bottom 24 or the seatback 30 to which the frangible pin 71 is engaged. The frangible pin 71 is frangible relative to the hub 70 and/or the seat bottom 24 or seatback 30 to which the frangible pin 71 is engaged. Torque applied to the hub 70 may, in part, be transmitted to the frangible pin 71 and generate bending and/or sheer stress therein. The frangible pin 71 may move from the unfractured stated to the fractured state upon application of a threshold amount of torque to the hub 70. The threshold amount of torque may be empirically and/or experimentally determined, i.e., such that the threshold amount of torque is greater than torque applied to the hub 70 during normal use of the seat 52. For example, the threshold amount of torque may be high enough such that the frangible pin 71 remains in the unfractured state and inhibits movement of the seatback 30 relative to the seat bottom 24 when an occupant enters or exits the seat 52, etc.

The actuator 32 of the assembly 20 is active, i.e., the actuator 32 responds to a signal from a computer 72 or like. The actuator 32 may include pyrotechnic material. The pyrotechnic may be combustible to produce a gas. The pyrotechnic material may be formed of a solid mixture of substances that, when ignited, react to produce the gas. For example, the pyrotechnic material may be formed of sodium azide (NaNO3), potassium nitrate (KNO3), and silicon dioxide (SiO2), which react to form nitrogen gas (N2). The pyrotechnic material may be, for example, disposed within a cylinder of the actuator 32 and adjacent a piston. Upon actuation, the pyrotechnic material may expand and move the piston within the cylinder. As another example, the actuator 32 may include a spool. Upon actuation, the pyrotechnic material may expand and rotate the spool. The actuator 32 may include a motor and/or other electromechanical, hydraulic, pneumatic structure other suitable structure for generating torque in response to a signal from the computer 72. For example, the actuator 32 may include a pretensioner, a servo, etc. The actuator 32 may, upon actuation, generate sufficient force to move the frangible pin 71 to the fractured state.

The actuator 32 is operatively connected to the seatback 30, i.e., such that actuation of the actuator 32 in response to the signal from the computer 72 rotates the seatback 30 about the vertical axis A1 toward one of the sides 28 of the seat bottom 24. The actuator 32 may be fixed relative to one of the seat bottom 24 or seatback 30, e.g., the actuator 32 may be fixed to the base plate 61. The actuator 32 is operatively connected to the swivel 64, i.e., such that force generated by the actuator 32 is transmitted to the seatback 30, e.g., via the swivel 64. For example, a cable 74 may connect the actuator 32 to the swivel 64. One end of the cable 74 may be fixed to, e.g., wound around, the hub 70. An opposite end of the cable 74 may be fixed to the actuator 32, e.g., to the piston, the spool, etc. Force from the actuator 32 may be applied to the hub 70 via tension in the cable 74. Any other suitable structure may operatively connect the actuator 32 to the seatback 30, e.g., gears and/or other mechanical linkages.

The assembly 20 may include a bracket 76, shown in FIG. 3-5, connecting the seat bottom 24 and the seatback 30. The bracket 76 may include a main body 77 and a pair of legs 78. The legs 78 may extend away from the main body 77. The legs 78 may extend away from the seat bottom 24, e.g. toward the seatback 30. The legs 78 may be spaced from each other along the cross-vehicle axis A3 e.g., with one of the legs 78 at each side of the seat bottom 24.

The bracket 76 may be rotatably supported by the seat bottom 24, i.e., to rotate toward one of the sides 28 of the seat 52 along with the seatback 30. The bracket 76 may be rotatably supported by the longitudinal frame members 60 and/or the base plate 61. For example, the bracket 76 may be fixed on top of the swivel 64. The swivel 64 may enable the bracket 76 to rotate about the rotational axis A4 relative to longitudinal frame members 60 and/or the base plate 61. The bracket 76 may be between the pair of longitudinal frame members 60 along the cross-vehicle axis A3. The bracket 76 may be between the rear 26 and the front 62 of the seat bottom 24 along the longitudinal axis A2.

The bracket 76 may rotatably support the seatback 30, i.e., such that the seatback 30 can rotate relative to the bracket 76 and the seat bottom 24, e.g., about the longitudinal axis A2 between various upright and reclining positions. The pair of upright frame members 56 of the seatback 30 may be connected to the legs 78 of the bracket 76, e.g., with a seat recliner assembly 80 or the like. The seat recliner assembly 80 may include a motor, spring, gears, locking mechanism, and/or other suitable structure for pivoting the seatback 30 relative to the seat bottom 24. The upright frame members 56 of the seatback 30 may be between the legs 78 of the bracket 76. For example, one of the legs 78 may be outboard of each of the upright frame members 56 relative to the seat.

Figure 6:
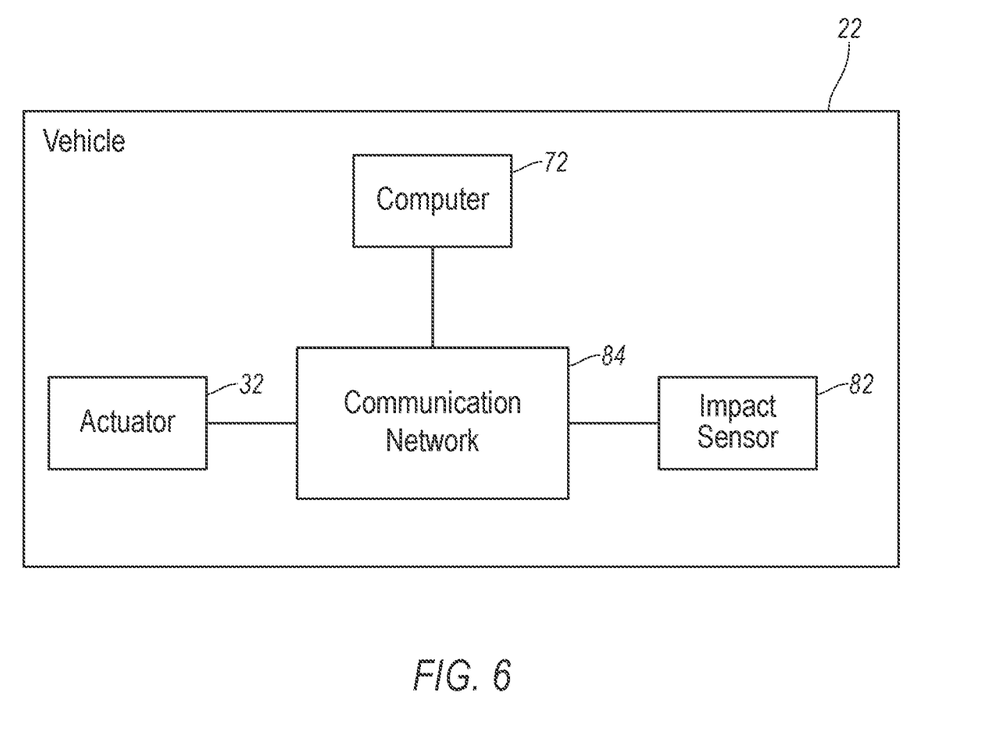
FIG. 6 is a block diagram of components of the vehicle.

With reference to FIG. 6, the vehicle 22 may include at least one impact sensor 82 for sensing impact of the vehicle 22. The impact sensor 82 may be in communication with the computer 72. The impact sensor 82 is configured to detect an impact to the vehicle 22. The impact sensor 82 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 82 may be located at numerous points in or on the vehicle 22.

The computer 72 is a microprocessor-based controller implemented via circuits, chips, or other electronic components. The computer 72 includes a processor and a memory such as are known. The memory includes one or more forms of computer 72 readable media, and stores instructions executable by the computer 72 for performing various operations, including as disclosed herein. The computer 72 of the vehicle 22 may be programmed to execute operations disclosed herein. Specifically, the memory stores instructions executable by the processor to execute the operations disclosed herein and electronically stores data and/or databases. electronically storing data and/or databases. For example, the computer 72 may include one or more dedicated electronic circuit including an ASIC (Application Specific Integrated Circuit) that is manufactured for a particular operation. In another example, the computer 72 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g. stored in a memory electrically connected to the FPGA circuit. In some examples, a combination of processor(s), ASIC(s), and/or FPGA circuits may be included inside a chip packaging. The computer 72 may be a set of computers communicating with one another.

The computer 72 is generally arranged for communications on a communication network 84 that can include a bus in the vehicle 22 such as a controller area network (CAN) or the like, and/or other wired and/or wireless mechanisms. Via the communication network 84, the computer 72 may transmit messages to various devices in the vehicle 22 and/or receive messages (e.g., CAN messages) from the various devices, e.g., the actuator 32, the impact sensor 82, etc. Alternatively or additionally, in cases where the computer 72 comprises a plurality of devices, the communication network 84 may be used for communications between devices represented as the computer 72 in this disclosure.

The computer 72 may be programmed to detect an impact to the vehicle 22, e.g., based on data from the impact sensor 82 received via the communication network 84. The computer 72 may be programmed to identify which side 42, 44 of the vehicle 22 is receiving the impact, e.g., whether the impact is to the left side 44 of the vehicle 22 or to the right side 42 of the vehicle 22. For example, the data received from the impact sensor 82 may indicate an impact to the left side 44 of the vehicle 22 or an impact to the right side 42 of the vehicle 22.

The computer 72 may be programmed to command the actuator 32 to rotate the seatback 30. For example, the computer 72 may transmit a signal to the actuator 32, e.g., commanding activation of the pyrotechnic material, the motor, etc., of the actuator 32. The computer 72 may command the actuator 32 to rotate the seatback 30 in response to detecting an impact to the vehicle 22. In other words, the computer 72 may be programmed such that detection of the impact causes actuation of the actuator 32. The computer 72 may actuate the actuator 32 to rotate the seatback 30 away from the side of the vehicle 22 receiving the impact. For example, the computer 72 may command the actuator 32 of the seat 52 on the right side 42 of the vehicle 22 to rotate such seat 52 toward the right side 42 upon detecting an impact to the left side 44 of the vehicle 22, and may command the actuator 32 of the seat 52 on the left side 44 of the vehicle 22 to rotate such seat 52 toward the left side 44 upon detecting an impact to the right side 42 of the vehicle 22.

Figure 7:
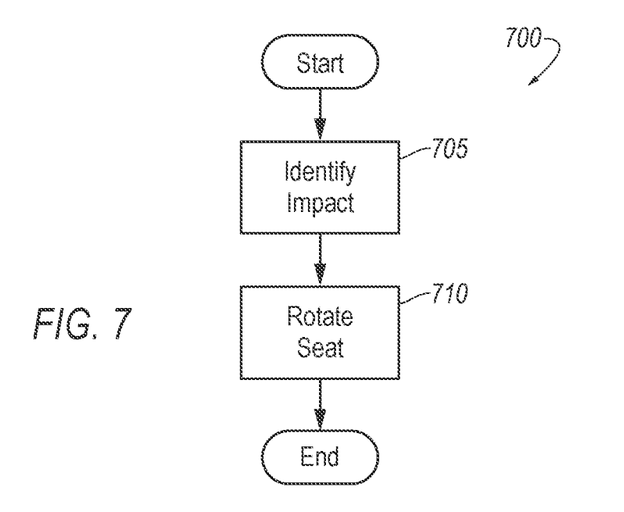
FIG. 7 is a flow chart illustrating a process for controlling rotation of the seatback to the rotated position.

FIG. 7 is a process flow diagram illustrating an exemplary process 700 for operating the vehicle 22. The computer 72 may execute the process 700 when the vehicle 22 is traveling, e.g., moving along a road, or is otherwise operating under normal conditions. During the process 700 the computer 72 receives data, e.g., from the impact sensor 82 via the communication network 84. The computer 72 may receive such data substantially continuously and/or at time intervals, e.g., every 50 milliseconds. The computer 72 may store the data, e.g., on the memory.

The process 700 begins at a block 705, wherein the computer 72 detects an impact to the vehicle 22, e.g., based on data from the impact sensor 82. The computer 72 may identify the impact to the vehicle 22 as an impact to the right side 42 of the vehicle 22 or the left side 44 of the vehicle 22.

Next, a block 710 the computer 72 actuates either the actuator 32 of the seat 52 on the left side 44 of the vehicle 22 or the seat 52 on the right side 42 of the vehicle 22. The computer 72 actuates the respective actuator 32 based whether the impact was identified at the block 705 as being on the right side 42 or the left side 44 of the vehicle 22. When the data indicates the impact on the right side 42 of the vehicle 22, the computer 72 actuates the actuator 32 of the seat 52 on the left side 44 of the vehicle 22 to rotate the seatback 30 of such seat toward the left side 44 of the vehicle 22. When the data indicates the impact on the left side 44 of the vehicle 22, the computer 72 actuates the actuator 32 of the seat 52 on the right side 42 of the vehicle 22 to rotate the seatback 30 of such seat 52 toward the right side 42 of the vehicle 22. Upon actuation, the actuated actuator 32 may apply torque to the hub 70. The torque may be greater than the threshold amount of torque and may change the frangible pin 71 from the unfractured state to the fractured state. Once the frangible pin 71 is in the fractured state, the seatback 30 may rotate. Normal forces from the rotated seatback 30 may control kinematics of the occupant of such seat 52, e.g., limiting cross-vehicle movement of such occupant toward the other seat 52 and an occupant seated therein.

Computing devices, such as the computer 72, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Python, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

Use of "in response to" and "based on," herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a seat bottom having a rear and a pair of sides extending in a seat-forward direction from the rear;
   a seatback rotatably supported by the seat bottom;
   a swivel connected between the seat bottom and the seatback, the swivel permitting rotation of the seatback toward one of the sides of the seat bottom to a rotated position and inhibiting rotation of the seatback from the rotated position toward the other of the sides of the seat bottom; and
   an active actuator operatively connected to the seatback to rotate the seatback about a vertical axis toward one of the sides of the seat bottom.

2. The assembly of claim 1, wherein the active actuator includes pyrotechnic material.

3. The assembly of claim 1, further comprising a bracket rotatably supported by the seat bottom, the seatback rotatably supported by the bracket.

4. The assembly of claim 3, wherein the seat bottom includes a pair of longitudinal frame members, the bracket rotatably supported by the longitudinal frame members.

5. The assembly of claim 4, wherein the seat bottom includes a base plate fixed to the longitudinal frame members, the bracket rotatably supported by the base plate.

6. The assembly of claim 4, wherein the bracket is between the pair of longitudinal frame members.

7. The assembly of claim 6, wherein the bracket includes legs extending away from the seat bottom, and wherein the seatback includes a pair of upright frame members connected to the legs of the bracket.

8. The assembly of claim 7, wherein the upright frame members of the seatback are between the legs of the bracket.

9. The assembly of claim 1, wherein the swivel includes a ratchet gear and a pawl configured to permit rotation of the seatback to the rotated position and inhibit rotation of the seatback from the rotated position.

10. The assembly of claim 1, wherein the active actuator is operatively connected to the swivel.

11. The assembly of claim 10, further comprising a cable connecting the active actuator to the swivel.

12. The assembly of claim 11, wherein the swivel includes a hub, and wherein the cable is wound around the hub.

13. The assembly of claim 1, further comprising a frangible pin inhibiting rotation of the swivel in an unfractured state and permitting rotation in a fractured state, and wherein actuation of the active actuator changes the frangible pin from the unfractured state to the fractured state.

14. The assembly of claim 1, further comprising a computer in communication with the active actuator, the computer having a processor and a memory storing instructions executable by the processor to command the active actuator to rotate the seatback.

15. The assembly of claim 14, wherein the instructions include instructions to command the active actuator to rotate the seatback in response to detecting an impact to a vehicle.

16. The assembly of claim 15, wherein the instructions include instructions to identify a side of the vehicle receiving the impact, and to actuate the active actuator to rotate the seatback away from the side of the vehicle receiving the impact.

* * * * *